United States Patent [19]

Nicholson

[11] 4,416,540
[45] Nov. 22, 1983

[54] APPARATUS AND METHOD FOR HOLOGRAPHIC CONTACT COPYING

[76] Inventor: Peter Nicholson, 4401 - 11th St., Long Island City, N.Y. 11101

[21] Appl. No.: 323,953

[22] Filed: Nov. 23, 1981

[51] Int. Cl.³ .............................................. G03H 1/20
[52] U.S. Cl. .................................................. 350/3.69
[58] Field of Search ....................... 350/3.69, 3.6, 320

[56] References Cited

U.S. PATENT DOCUMENTS

| | | |
|---|---|---|
| 3,410,203 | 12/1968 | Fischbeck . |
| 3,560,210 | 2/1971 | Groblin, Jr. . |
| 3,572,879 | 3/1971 | Nassenstein et al. . |
| 3,647,289 | 3/1972 | Weber . |
| 3,667,946 | 6/1972 | Sturdevant . |
| 3,752,557 | 8/1973 | Belvaux . |
| 3,758,186 | 9/1973 | Brumm . |
| 3,790,245 | 2/1974 | Hannan et al. . |
| 3,882,207 | 5/1975 | Hannan et al. . |
| 4,043,653 | 8/1977 | Croce et al. . |
| 4,043,654 | 8/1977 | Silverberg . |

OTHER PUBLICATIONS

Defensive Publication No. 697,792, by Harper et al., in Defensive Publications, published at 861 O.G., p. 703, Apr. 15, 1969.

*Primary Examiner*—Bruce Y. Arnold
*Attorney, Agent, or Firm*—Brumbaugh, Graves, Donohue & Raymond

[57] ABSTRACT

An apparatus and method for making holographic copies of film holograms via a contact copying process is disclosed. The apparatus comprises a tray having a clear flat bottom which receives the hologram master film, the blank film and a cover sheet. A pressure roller is provided to move across the cover sheet, to establish good optical contact between the films, in unison with and in alignment with a slit defining curtain being moved across the underside of the tray. A hologram reconstruction beam is beneath and aimed at the curtain so that light passes through the slit and duplicates onto the blank film only that part of the master hologram and film hologram subject to pressure from the pressure roller.

10 Claims, 1 Drawing Figure

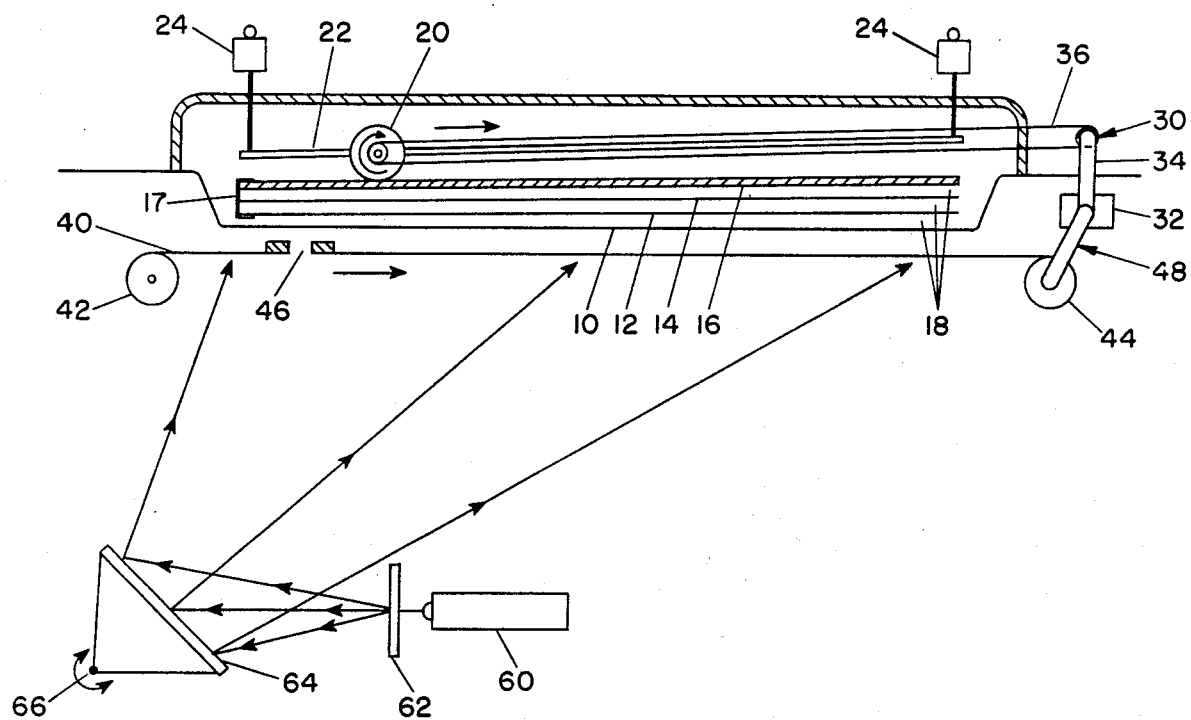

APPARATUS AND METHOD FOR HOLOGRAPHIC CONTACT COPYING

BACKGROUND OF THE INVENTION

1. Technical Field

This invention relates to an apparatus and method for the reproduction of holographic films from a master holographic film by a contact printing process.

2. Description of the Prior Art

In order to facilitate replication of volume transmission holograms, it is usually been required to create the original hologram on a glass plate, and then reproduce the recorded image on another glass plate. The second glass plate or the contact copy plate, is placed with emulsion side exposed to the emulsion side of the original volume hologram. An index matching fluid such as Xylene is placed between the two plates and all air is carefully expelled. The recorded image in the original hologram is then reconstructed using a coherent reference beam which should duplicate the curvature, direction, and wave length of the original reference beam used to create the original hologram. This results in a maximum efficiency undistorted reconstruction of the original subject being defracted to the second copy plate and recording of the image therein.

For efficient copying with high quality results, it is vital that the original hologram and the copy plate be in good optical contact and that the reconstruction beam have characteristics similar to the original reference beam used to create the original hologram. When both the original and contact copy holograms are glass plates, good optical contact and therefore high quality copying can be achieved. However, glass plates are rather expensive and when large holograms are desired, larger glass plates usually are not even available.

Recently, films such as Mylar have been used in place of the glass plates, since they are generally less expensive and available in large sizes for larger hologram recording. However, since the film is not perfectly flat in its natural state, it is not as easy to create high quality reproductions using the method described above for glass plates. It is also necessary that the emulsion of the original hologram and the emulsion of the copy hologram be close enough together during the exposure replication process in order to prevent a loss of resolution due to the defraction of incident light by the original hologram. Unless close contact is maintained during the exposure process, defraction in the region between the two emulsions will seriously deteriorate the fringe pattern required by the emulsion of the copy. The reconstruction of the recorded duplicated image will be substantially inferior in quality as compared to the image reconstructed from the original hologram.

It is therefore an objective of this invention to provide a simple means of creating optical contact between two pieces of film while holding them flat enough for the copying to take place, while also allowing for easy separation of the films after the duplication.

Another object of the invention is to provide for various geometries for reconstruction beams, along with a moving slit defining member that causes exposure only on the part of the films that are in close optical contact with each other.

SUMMARY OF THE INVENTION

In accordance with the invention, an apparatus for producing a film copy hologram from a film master hologram containing a recorded image is provided comprising a tray having a generally clear bottom for holding a master hologram film, a blank film and a cover sheet in a substantially flat condition. The two films and cover films are placed so that the non-emulsion side of the master film is in contact with the bottom of the tray and with the emulsion sides of the two films in contact with each other. The cover is placed on top of the blank film. Means are provided for exerting pressure on the top of the cover sheet to obtain optical contact betweeen the respective mating surfaces of the cover sheet, blank film, master film and tray bottom. A slit defining member and means for moving this member are provided on the underside of the tray. Also underneath the tray is provided the means for generating a reconstruction beam and for directing the beam through the slit and tray bottom, to thereby duplicate in the blank film the holographic image on the master film.

The invention also provides a method of producing a film copy hologram from a film master hologram containing a recorded image. The method comprises the steps of: placing the film master emulsion side up in a tray having a generally clear bottom; placing a blank film emulsion side down on top of the film master; and placing a cover sheet on top of the blank film. Pressure is then exerted on the cover sheet to establish optical contact between the cover sheet, blank film, master film and tray bottom. A slit defining member is then moved across the underside of the tray while a reconstruction beam is directed at the slit. The image present in the master film is thus duplicated in the blank film.

Numerous other advantages and features of the present invention will become readily apparent from the following detailed description of the invention and of one embodiment thereof, from the claims and from the accompanying drawings.

BRIEF DESCRIPTION OF THE DRAWING

The FIGURE is a side elevational view, in partial cross-section, of a preferred embodiment according to the invention.

DETAILED DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Referring now to the FIGURE, there is shown a tray or glass platen 10 having a clear bottom. A master film hologram 12 is disposed in the tray with its emulsion side up in a direction away from the tray bottom. Disposed on top of the master film with its emulsion side down, is a clean or blank holographic film 14. Disposed on top of the clean or blank holographic film 14 is a cover sheet 16, which is preferably comprised of Teflon. A fastening clip 17 is provided for holding the edge of one or more of the films 12, 14 and cover sheet 16, to hold these elements in place.

An optical index matching fluid 18, which is preferably Xylene or the like, is disposed between the facing surfaces of materials 10, 12, 14 and 16.

A pressure roller 20, disposed in roller guide 22 is adapted to exert pressure on the upper surface of the cover sheet 16. For purposes of illustration, the tray 10, master film 12, blank film 14, and cover sheet 16 are shown spaced slightly apart. However, the pressure roller 20 is intended to press these materials in firm contact with each other to establish good optical contact therebetween. The roller 20 is carrier by roller guide 22 which is further carried by a pair of piston-cylinder mechanisms 24 having one secured to the frame of the machine and the other end secured to the guide 22. Since the FIGURE is shown in partial cross section, only the guide 22 and piston-cylinder mechanisms 24 for one side of the roller 20 are shown. Suitable mechanisms would be used on both sides of the roller 20.

A roller turning mechanism 30 serves to move the roller 20 from left to right as shown in the FIGURE during the exposure process. The roller turning mechanism 30 could be a conventional motor 32 with drive belts or chains 34 and 36.

Underneath the tray 10 is disposed a curtain 40 having it ends attached to 2 two rollers 42 and 44. The curtain 40 defines a slit 46. Attached to roller 44 is a curtain roller turning mechanism 48 which works in unison with and in conjunction with pressure roller turning mechanism 30, as shown. Thus, by working the pressure roller 20 and the slit 46 of the curtain 40 in unison with one motor 32, the portion of tray bottom 20 exposed to view from beneath the curtain 40 will be just beneath the pressure roller 20.

A holographic reconstruction beam is generated beneath the curtain 40 and comprises a laser source 60, a spatial filter 62 and reflective surface 64. The reflective surface 64 is preferably a mirror having a pivotal adjustment means 66 for enabling adjustment of the mirror's reflective surface position, to optimize the intensity of the reconstruction beam incident on the underside of the tray.

It will be seen that according to the invention, only a strip of the master film hologram will be reproduced on the blank film hologram at any one time, and preferably only that strip or portion of those film holograms will have pressure exerted above. It is to be understood, however, that instead of pressure roller 20, other means for exerting pressure, such as a planar pressure platen, could be used to exert pressure on the upper surface of the entire Teflon sheet 16. However, using the pressure roller 20 to selectively exert pressure only on the portion or slit of films being exposed from beneath will minimize space between the films, tray and cover sheet during exposure of the clear film, which will in turn result in a good reconstruction image when the holographic duplicate is illuminated by a reconstruction beam.

The apparatus and method disclosed herein, by providing for superior reproduction in holographic films will facilitate the making and reproduction of large scale holograms which have previously been impossible or impractical due to the availability and/or cost of relatively large glass plates.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. An apparatus for producing a film copy hologram from a film master hologram containing a recorded image, comprising:
    tray means having a generally clear bottom for holding a master holographic film, a blank film and a cover sheet in a substantially flat condition, with the blank film between the master film and cover sheet, and with the emulsion side of the blank film generally in contact with the emulsion side of the master film, and with the other side of said master film generally in contact with the bottom of said tray; means for exerting pressure on the cover sheet to obtain optical contact between the cover sheet and blank film, between the blank film and master film, and between the master film and tray bottom; means for defining a slit and means for moving same across the underside of said tray; and means for generating a reconstruction beam and for directing said beam to the underside of said tray and through said slit and clear tray bottom, to thereby duplicate in the blank film the holographic image in the master film.

2. The apparatus as set forth in claim 1 wherein the means for exerting pressure comprises a roller means and means for moving same generally in unison with said slit defining means, to thereby establish good optical contact between the blank film, master film and tray bottom at the position of the slit defining means.

3. The apparatus as set forth in claim 1 wherein the cover sheet comprises an opaque Teflon sheet.

4. The apparatus as set forth in claim 1 wherein the tray means comprises a substantially flat glass tray disposed generally horizontally and having sides to contain index matching fluid received on the tray between the tray bottom and master film, between the master film and blank film and between the blank film and cover sheet.

5. The apparatus as set forth in claim 1 wherein the means for defining a slit comprises a generally opaque curtain which defines a slit narrow in with relative to its ength, said curtain being attached to rollers at its ends with said rollers at the ends of said tray, and wherein the means for moving the slit across the underside of the tray comprises means for driving one of said rollers.

6. The apparatus as set forth in claim 1 wherein the means for generating a reconstruction beam and for directing said beam to the underside of said tray comprises: a laser light source, a spatial filter and a mirror positioned to receive laser light generated by said light source after it passes through the spatial filter and to direct the beam by reflection toward the underside of the tray.

7. The apparatus as set forth in claim 6 wherein the mirror includes pivotal adjustment means for adjusting the position of the mirror's reflective surface to optimize the intensity of the reconstruction beam incident on the underside of the tray.

8. A method of producing a film copy hologram from a film master hologram containing and recorded image, comprising the steps of:
    placing the film master in a tray having a generally clear bottom with the emulsion side up;
    placing a blank film on top of the film master with the emulsion side down;
    placing a cover sheet on top of the blank film;
    exerting pressure on the cover sheet to establish optical contact between the cover sheet, blank film, master film and tray bottom; and moving a slit defining member across the underside of said tray while directing a reconstruction beam at the slit defining member, to thereby duplicate, in the blank film, the holographic image present in the master film.

9. The method in accordance with claim 8 wherein the step of exerting pressure includes:

moving a pressure roller across the cover sheet in unison with said slit defining member.

10. The method in accordance with claim 8 further including the step of providing optical index matching fluid between the film master and the tray, between the blank film and the film master, and between the blank film and the cover sheet.

* * * * *